United States Patent
Dietrich (10) Patent No.: US 11,815,181 B2
(45) Date of Patent: Nov. 14, 2023

(54) SEALING DEVICE (71) Applicant: AGCO International GmbH, Neuhausen (CH)

(72) Inventor: Ulrich Dietrich, Oberdiesen (DE)

(73) Assignee: AGCO International GmbH, Neuhausen (CH)

( * ) Notice: Subject to any disclaimer, the term of this patent is extended or adjusted under 35 U.S.C. 154(b) by 173 days.

(21) Appl. No.: 17/417,104

(22) PCT Filed: Oct. 29, 2019

(86) PCT No.: PCT/EP2019/079485
§ 371 (c)(1),
(2) Date: Jun. 21, 2021

(87) PCT Pub. No.: WO2020/126177
PCT Pub. Date: Jun. 25, 2020

(65) Prior Publication Data
US 2022/0074495 A1 Mar. 10, 2022

(30) Foreign Application Priority Data
Dec. 19, 2018 (GB) ...................................... 1820718

(51) Int. Cl.
*F16L 27/093* (2006.01)
*F16J 15/08* (2006.01)
(52) U.S. Cl.
CPC ......... *F16J 15/0818* (2013.01); *F16L 27/093* (2013.01)

(58) Field of Classification Search
CPC ...... F16J 15/0818; F16L 27/093; F16L 27/00; B60T 17/04; F16B 39/108
See application file for complete search history.

(56) References Cited

U.S. PATENT DOCUMENTS

| 3,307,853 | A | * | 3/1967 | Hauk | F02M 55/004 411/542 |
|---|---|---|---|---|---|
| 4,333,505 | A | * | 6/1982 | Jones | A61J 1/05 24/11 R |
| 4,356,760 | A | | 11/1982 | Bouteille | |
| 4,742,194 | A | | 5/1988 | Legris | |
| 4,775,174 | A | * | 10/1988 | Dalla Bona | F16L 27/093 285/190 |
| 5,362,111 | A | * | 11/1994 | Harbin | F16L 19/005 285/330 |
| 5,403,041 | A | * | 4/1995 | Merkel | F16L 27/093 285/190 |

(Continued)

FOREIGN PATENT DOCUMENTS

| FR | 2695437 A1 | 3/1994 |
|---|---|---|
| GB | 2 518 205 A | 3/2015 |

(Continued)

OTHER PUBLICATIONS

Uk Intellectual Property Office, Search Report for UK Priority Application No. GB1820718.3, dated Jun. 12, 2019.

(Continued)

*Primary Examiner* — Eugene G Byrd (57) ABSTRACT

A sealing device for banjo fittings including a sealing ring, a gasket and one or more straps attaching the sealing ring to the gasket.

5 Claims, 6 Drawing Sheets

(56) References Cited

U.S. PATENT DOCUMENTS

| | | | | |
|---|---|---|---|---|
| 5,403,042 | A | * | 4/1995 | Negron ................. F16L 27/093 29/469 |
| 6,007,109 | A | * | 12/1999 | Schoetz ................ F16L 41/005 285/190 |
| 7,988,201 | B2 | * | 8/2011 | Randle ................. F16L 27/093 285/190 |
| 2003/0042737 | A1 | | 3/2003 | Sampson |
| 2005/0189408 | A1 | | 9/2005 | Corbett |
| 2006/0033328 | A1 | * | 2/2006 | Skiba .................... F16L 19/005 285/92 |
| 2008/0277920 | A1 | * | 11/2008 | Randle ................. F16L 27/093 29/525.01 |
| 2018/0291946 | A1 | * | 10/2018 | Mallard ................. F16J 15/068 |
| 2019/0219203 | A1 | * | 7/2019 | Churchill .............. F16B 43/001 |
| 2021/0372347 | A1 | * | 12/2021 | Benner .................... F02F 11/00 |

FOREIGN PATENT DOCUMENTS

| | | | |
|---|---|---|---|
| JP | 08247360 A * | 9/1996 | ............ F16L 27/093 |
| WO | 2005/116507 A1 | 12/2005 | |
| WO | 2010/082945 A1 | 7/2010 | |

OTHER PUBLICATIONS

European Patent Office, International Search Report for related International Application No. PCT/EP2019/079485, dated Feb. 10, 2020.

\* cited by examiner

SEALING DEVICE

FIELD OF THE INVENTION

The present invention relates to a sealing device for fluid connections. In particular, the invention relates to a sealing ring and gasket joined by a strap for banjo fittings on hydraulic or pneumatic connections.

TECHNICAL BACKGROUND

Hydraulic systems are used in many applications for example, for power and control of hydraulically actuated implements on an agricultural tractor, for example a front loader.

The hydraulic actuators of such systems and indeed in most hydraulic systems require the connection of hydraulic hoses to another hydraulic component.

To ensure the reliable operation of such hydraulic systems it is necessary to prevent fluid leaks at the connections. Such hydraulic connections are primarily used where high pressure occurs.

It is known to provide a sealing device such as a washer at such junctions. However, washers often do not provide sufficient levels of sealing especially when using banjo fittings or the like.

It is in an objective of the present invention to provide an improved sealing device with a sealing ring and gasket for hydraulic connections.

Moreover such a sealing device can be also used for pneumatic or other fluid connections.

SUMMARY OF THE INVENTION

Accordingly, there is provided a sealing device for banjo fittings, the sealing device comprising: a sealing ring; a gasket; and one or more straps; wherein the one or more straps attach the sealing ring to the gasket.

The straps allow an operator to more easily install the sealing device on a fluid connection for instance the bolt on a banjo fitting. Especially avoiding the incorrect assembly of two different sealing means.

Advantageously, at least one of the straps may include an orientation indicator.

The orientation indicator provides an easy reference to ensure that the sealing device is installed with the correct orientation.

Advantageously, the orientation indicator may be an arrow formed by the overall shape of the strap.

This provides an easily understood reference for a fitter installing the sealing device.

Advantageously, the orientation indicator may be moulded into at least one of the straps.

Moulding the orientation indicator into the strap means that no further machining steps are required since the imprint of the orientation indicator can be included in the manufacturing of the straps.

Advantageously, at least one of the straps may include an RFID tag.

The RFID tag can be used to store data which can then be read allowing the sealing device to be easily identified and or the fluid connection to which the sealing device is attached to be easily identified.

BRIEF DESCRIPTION OF THE DRAWINGS

Embodiments of the invention will now be described, by way of example only, with reference to the accompanying drawings, in which.

The drawings are provided by way of reference only, and are not to scale.

DETAILED DESCRIPTION OF SPECIFIC EMBODIMENTS

Figure 1:
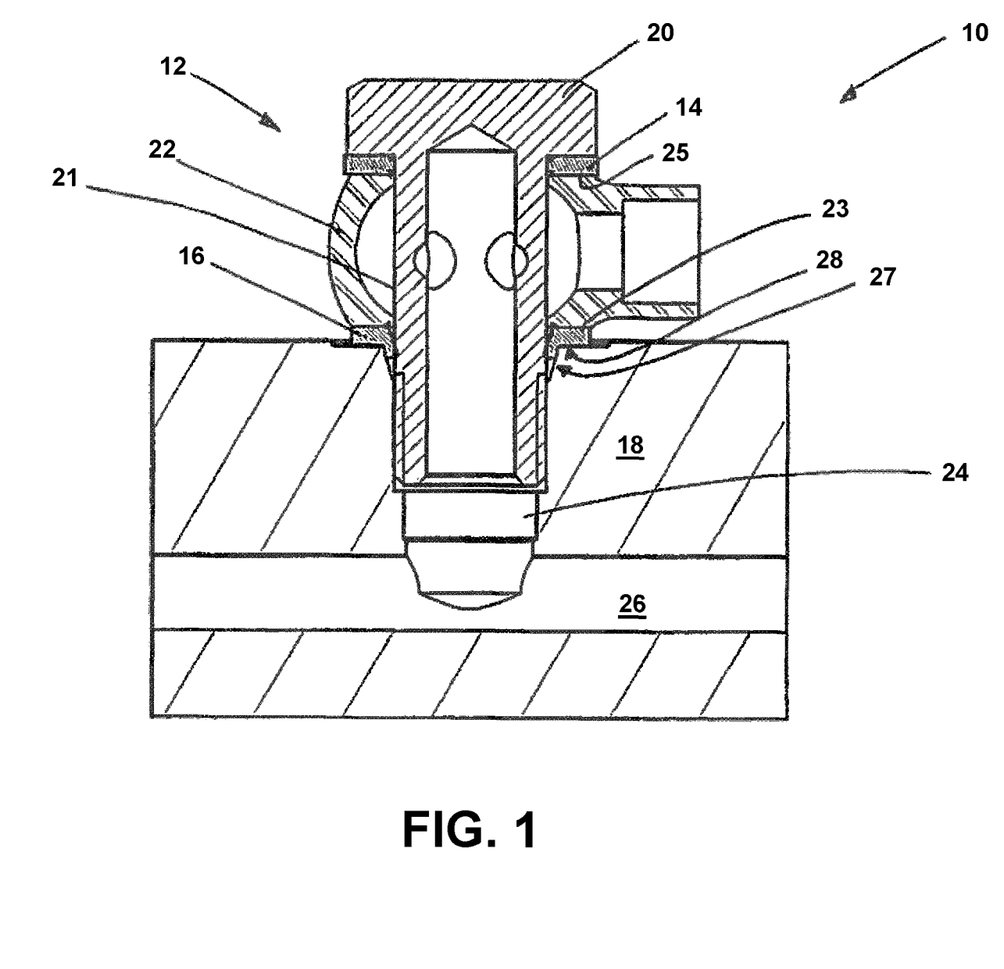
FIG. 1 is a cross sectional view of a hydraulic connection showing a sealing ring in use.

With reference to FIG. 1, there is shown a hydraulic connection 10.

The hydraulic connection 10 comprises a banjo fitting 12, a gasket 14 (a first sealing means), a sealing ring 16 (a second sealing means different from the first sealing means) and a hydraulic consumer body 18.

The banjo fitting 12 comprises a perforated hollow securing bolt 20 comprising a shank 21 and a spherical union 22, the spherical union 22 having an underside face 23 and an upper surface 25. Hydraulic fittings such as the banjo fitting 12 are common place and well known. In use the securing bolt 20 secures the spherical union 22 to the hydraulic consumer body 18.

The hydraulic consumer body 18 comprises a thru hole 24 which passes from the outside of the hydraulic consumer body 18 to a hydraulic conduit 26. Thus there is provided a hydraulic fluid flow path, the hydraulic flow path linking the spherical union 22 to the hydraulic conduit 26.

The thru hole 24 includes a chamfer 27 around the upper edge which enables more accurate and easier insertion of the banjo fitting 12 in particular the correct threading of the securing bolt 20.

The hydraulic consumer body 18 further includes a precisely machined surface known as a seat 28 which surrounds the opening of the thru hole 24 on the outside of the hydraulic consumer body 18.

The gasket 14 prevents leakage of hydraulic fluid between a top or upper surface 25 of the spherical union 22 and the underside of the securing bolt 20 in a conventional manner. In alternative embodiments, the gasket 14 may be a usit sealing ring, a washer or any other washer type sealing means.

The sealing ring 16 serves to prevent leakage of fluid from the hydraulic connection 10 between the underside of the spherical union 22 and the securing bolt 20 and the hydraulic consumer body 18 in particular, the sealing ring 16 contacts four surfaces on three different components. The four surfaces which the sealing ring contacts are the chamfer 27 and the seat 28 of the hydraulic consumer body 18, the shank 21 of the securing bolt 20 and an underside 23 of the spherical union 22.

Figure 2:
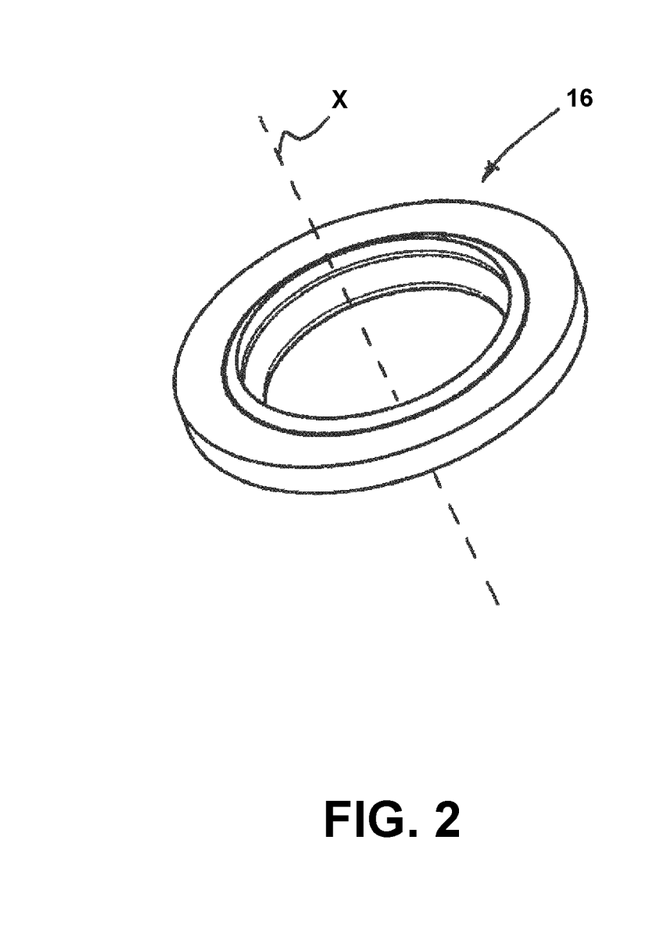
FIG. 2 is a perspective view of a sealing ring.
Figure 3:
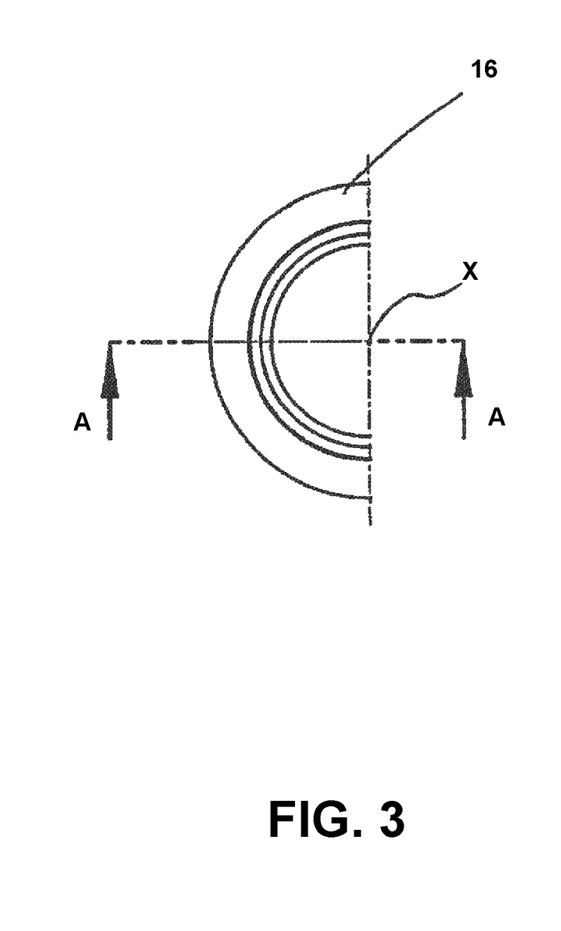
FIG. 3 is a top view of half a sealing ring showing a section line A-A.

Referring now to FIGS. 2 and 3, as shown a sealing ring 16, which defines a central axis X about which the cross section of the sealing ring 16 is revolved, in isolation with FIG. 3 showing half of a sealing ring 16 and a section line A-A. The section line A-A indicates where the sections shown in the remaining figures are taken from in relation to the overall sealing ring 16.

It will be understood that sealing rings 116, 216, 316, and 416 described in more detail in the following embodiments, are all interchangeable with and to be used in the same way as sealing ring 16.

Figure 4:
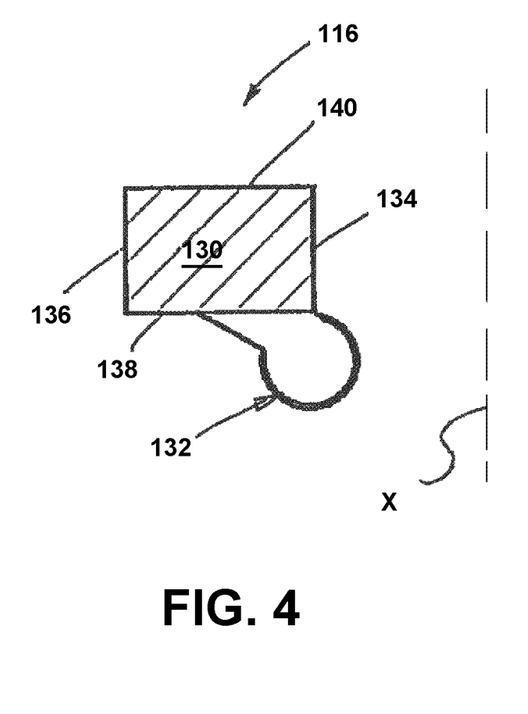
FIG. 4 is a cross section of a sealing ring according to one embodiment.

In an embodiment, with reference to FIG. 4, the sealing ring 116 comprises a substantially rectangular washer 130 and a sealing bead 132.

The washer 130 includes an inner face 134, an outer face 136, a first axial face 138 and second axial face 140. The cross section of the washer 130 is generally rectangular.

The inner face 134 of the washer 130 is defined as that face which faces toward the central axis X of the sealing ring 116.

The sealing bead 132 is generally circular in cross section and depends from the first axial face 138. The sealing bead 132 may however be of another cross sectional shape for example obround or triangular. The sealing bead 132 also projects further toward the axis X than the inner face 134 of the washer 130.

Figure 5:
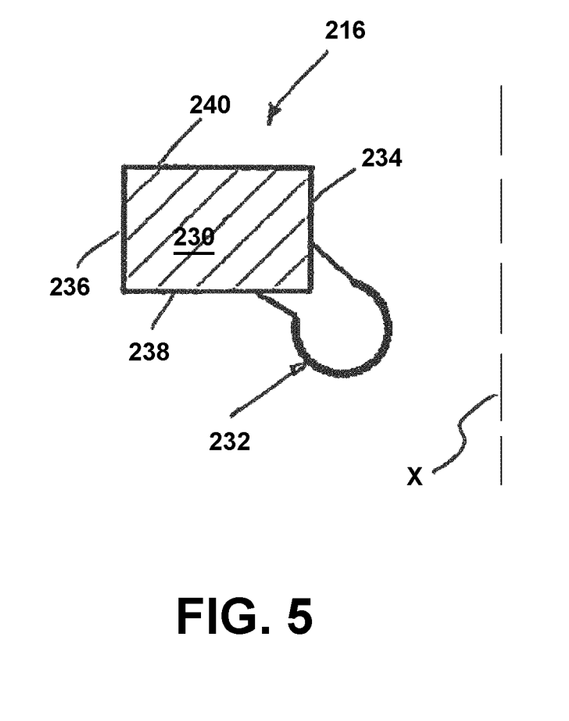
FIG. 5 is a cross section of a sealing ring according to another embodiment.

In a further embodiment, with reference to FIG. 5, the sealing ring 216 comprises a substantially rectangular washer 230 and a sealing bead 232.

The washer 230 includes an inner face 234, an outer face 236, a first axial face 238 and second axial face 240. The cross section of the washer 230 is generally rectangular.

The inner face 234 of the washer 230 is defined as that face which faces toward the central axis X of the sealing ring 216.

The sealing bead 232 is generally circular in cross section and depends from the first axial face 238 and extends from the inner face 234. The sealing bead 232 may however be of another cross sectional shape for example obround or triangular. The sealing bead 232 is attached to both the first axial face 238 and the inner face 234 of the sealing ring 216.

The sealing bead 232 also projects further toward the axis X than the inner face 234 of the washer 230 and depends past the first axial face 238 away from the washer 230.

Figure 6:
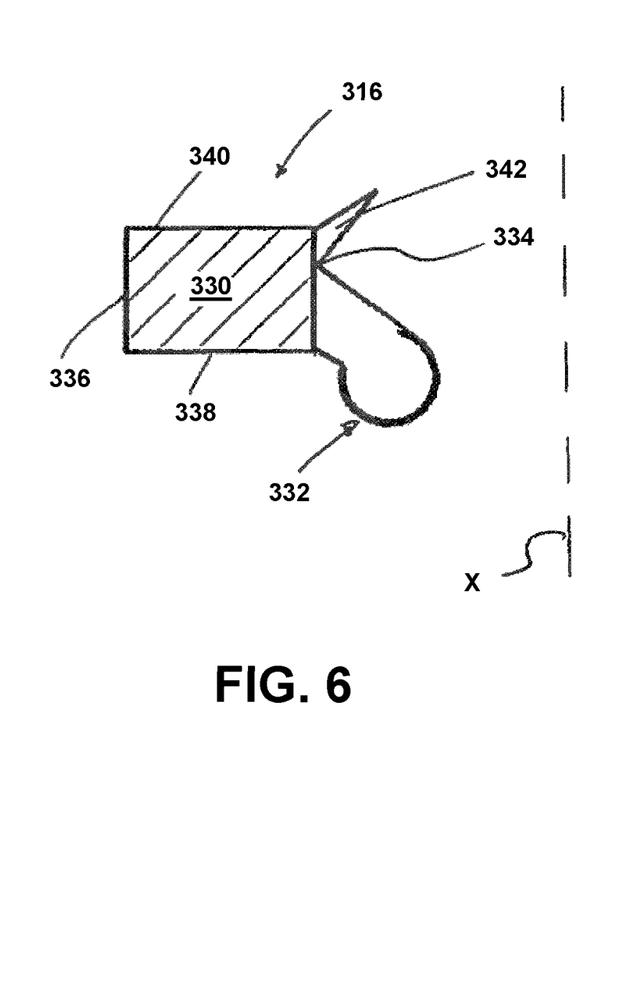
FIG. 6 is a cross section of a sealing ring according to another embodiment.

In another embodiment, with reference to FIG. 6, the sealing ring 316 comprises a substantially rectangular washer 330, a sealing bead 332 and a sealing lip 342.

The washer 330 includes an inner face 334, an outer face 336, a first axial face 338 and second axial face 340. The cross section of the washer 330 is generally rectangular.

The inner face 334 of the washer 330 is defined as that face which faces toward the central axis X of the sealing ring 316.

The sealing bead 332 is generally circular in cross section and extends from the first from the inner face 334 toward the axis X. The sealing bead 332 may however be of another cross sectional shape for example obround or triangular. The sealing bead 332 projects further toward the axis X than the inner face 334 of the washer 330. The sealing bead 332 also projects away from the washer 330 past the plane of the first axial face 338. The sealing bead 332 is solely attached to the inner face 334 of the sealing ring 316.

The sealing lip 342 is substantially triangular in cross section. The sealing lip 342 extends from the first from the inner face 334 toward the axis X. The sealing lip 342 projects further toward the axis X than the inner face 334 of the washer 330. The sealing lip 342 also projects away from the washer 330 past the plane of the second axial face 340. The sealing lip 342 is solely attached to the inner face 334 of the sealing ring 316. The sealing lip 342 is positioned on the inner face 334 of the washer 330 adjacent to the sealing bead 332. The sealing lip 342 and the sealing bead 332 project axially in opposite directions and both project from the inner face 334 in the same direction i.e. toward the axis X.

Figure 7:
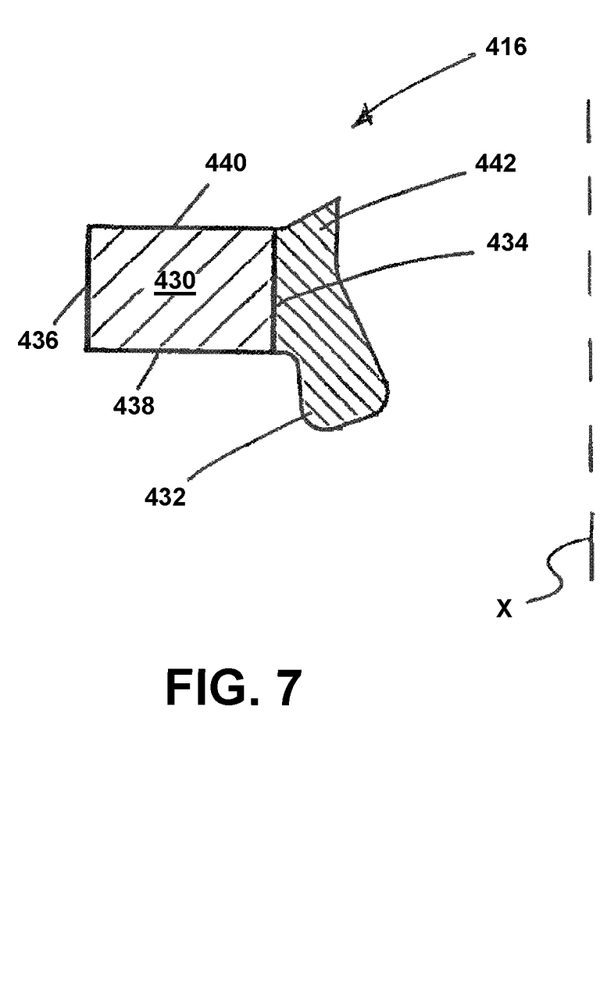
FIG. 7 is a cross section of a sealing ring according to yet another embodiment.

In yet a further embodiment, with reference to FIG. 7, the sealing ring 416 comprises a substantially rectangular washer 430, a sealing bead 432 and a sealing lip 442.

The washer 430 includes an inner face 434, an outer face 436, a first axial face 438 and second axial face 440. The cross section of the washer 430 is generally rectangular.

The inner face 432 of the washer 430 is defined as that face which faces toward the central axis X of the sealing ring 416.

The sealing bead 432 is generally obround in cross section and extends from the first from the inner face 434 toward the axis X. The sealing bead 432 is described as being obround in shape but it may be of a different cross sectional shape such as stadium shaped, oval circular or triangular. The sealing bead 432 projects further toward the axis X than the inner face 434 of the washer 430. The sealing bead 432 also projects away from the washer 430 past the plane of the first axial face 438. The sealing bead 432 is attached to the inner face 434 of the sealing ring 416.

The sealing lip 442 is substantially triangular in cross section. The sealing lip 442 extends from the first from the inner face 434 toward the axis X. The sealing lip 442 projects further toward the axis X than the inner face 434 of the washer 430. The sealing lip 442 also projects away from the washer 430 past the plane of the second axial face 440. The sealing lip 442 is attached to the inner face 434 of the sealing ring 416. The sealing lip 442 is also attached to the sealing bead 432.

The sealing lip 442 is positioned on the inner face 434 of the washer 430 adjacent to and contiguous to the sealing bead 432. Indeed in this specific example the sealing lip 442 and the sealing bead 432 are two portions of the same component and constructed from a single piece of material. However in other embodiments the sealing lip 442 and the sealing bead 432 maybe of dissimilar materials and separate components although will remain in contact with one another.

The sealing lip 442 and the sealing bead 432 project axially in substantially opposite directions and both project from the inner face 434 in the same direction i.e. toward the axis X. In this specific example the sealing bead 432 and the sealing lip 442 substantially cover the entire inner face 434 however it will be understood that in other embodiments they may only cover a portion of the inner face 434 of the washer 430.

It will be appreciated that the cross sectional shape of the sealing beads in all aforementioned embodiments can be anyone of a number of different geometrical shapes which will be selected to perform a specific task or best fit with the surfaces which it will contact during use. The geometric shape of the sealing lips 342 and 442 with similarly be selected dependent on application and may be circular or obround for example.

In use, it will be understood that the sealing beads 132, 232, 332, and 432 will deform elastically as they are trapped between the surfaces which they are intended to provide a seal.

The washers 130, 230, 330, and 430 may be of metallic construction and or of any suitable material for the specific application. Similarly the sealing beads 132, 232, 332, and 432 and the sealing lips 342 and 442 are elastomeric in construction but may be of any suitable material. the sealing beads 132, 232, 332, and 432 and the sealing lips 342 and 442 may be bonded to the respective washers 130, 230, 330, and 430 or indeed may be moulded onto the washers 130, 230, 330, and 430.

Figure 8:
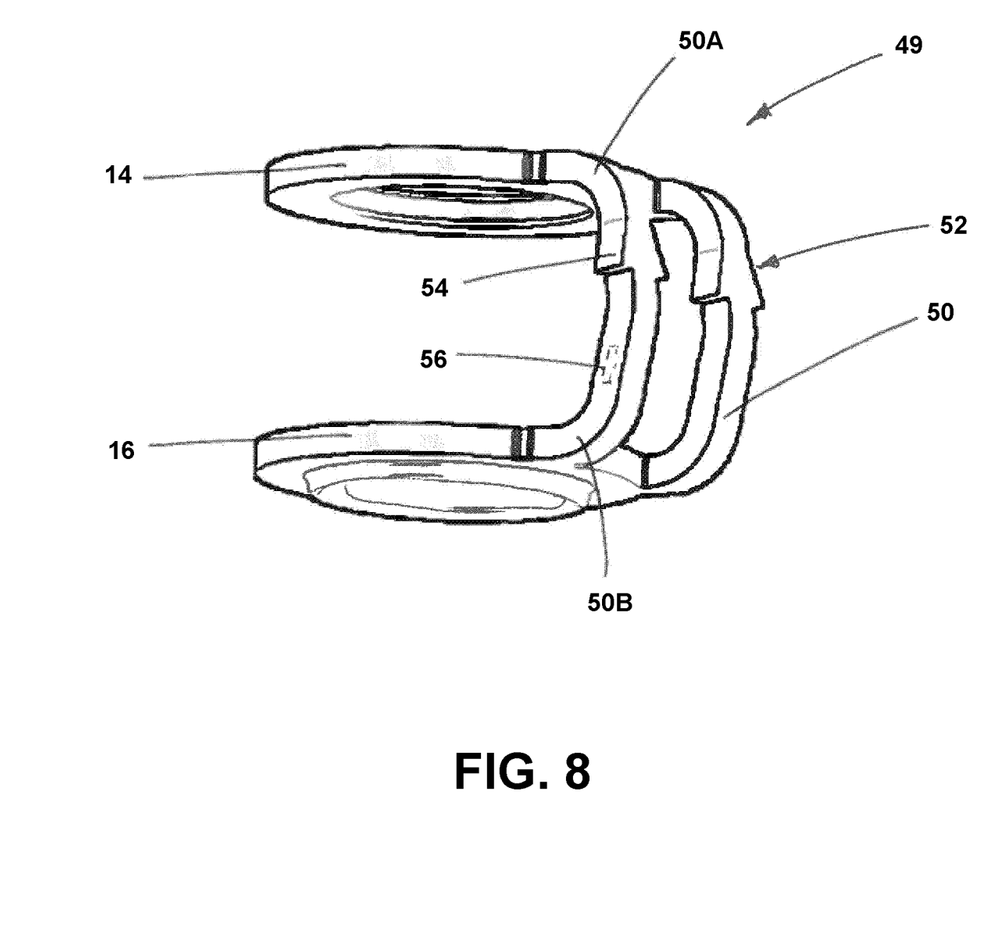
FIG. 8 is a perspective view of a further embodiment.
Figure 9:
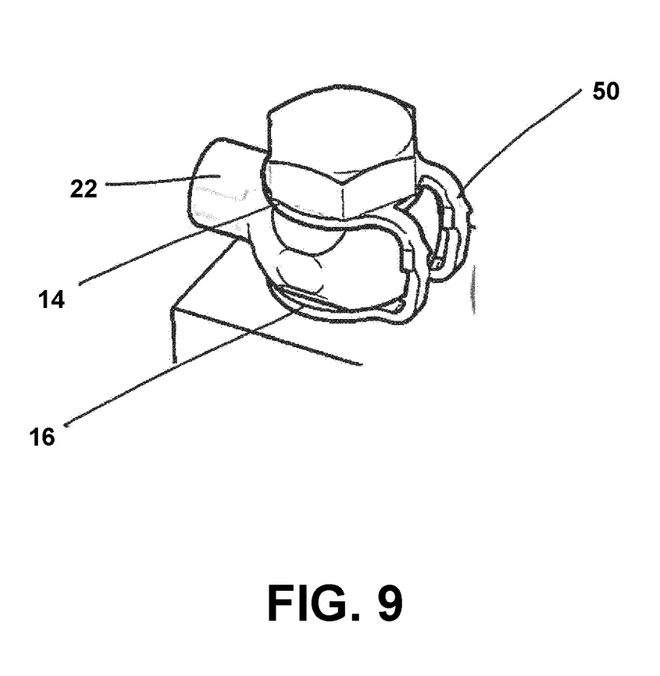
FIG. 9 is a perspective view of the embodiment of FIG. 8 in use.
Figure 10:
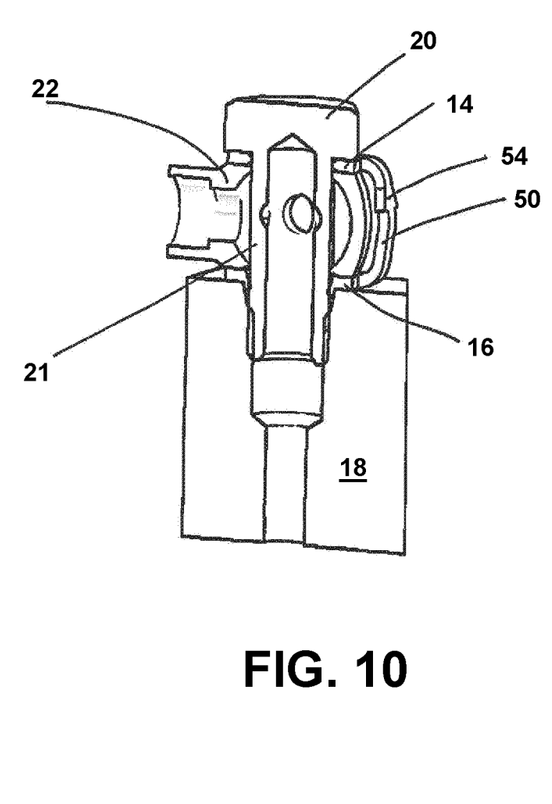
FIG. 10 is a sectioned view of FIG. 9.

With reference to FIGS. 8, 9 and 10 a further embodiment is shown. In this embodiment the gasket 14 and the sealing ring 16 are joined by two straps 50 thereby forming a sealing device 49. It will be understood that in alternative embodiments one strap or more than two straps may be used.

Each of the straps 50 comprises a first end 50A which is connected to the gasket 14 and a second end 50B which is attached to the sealing ring 16. The straps 50 may be made of any suitable material and may be flexible or relatively stiff and malleable i.e. capable of holding a predetermined shape to ensure a particular spacing between the gasket 14 and the sealing ring 16.

Each strap 50 may further include an orientation indicator. The orientation indicator 52 is used to indicate an installation orientation of the sealing device 49. In the specific example shown in FIGS. 8, 9 and 10, both straps 50 include an orientation indicator 52 in the form of an arrow 54. The arrow 54 is formed integrally into the strap 50. The orientation indicator 52 may in alternative embodiments be printed onto the surface of the strap 50 or even moulded into the surface of the strap 50. The orientation indicator 52 serves to indicate which way around the sealing ring 16 and gasket 14 should be installed on a fitting.

In yet further embodiment, one or more of the straps 50 includes and RFID tag 56. The RFID tag 56 is moulded into the strap 50 or otherwise affixed to the strap 50 in a permanent fashion. The RFID tag 56 stores information which can be used to identify the gasket 14 and sealing ring 16 combination and therefore identify the connection to which they should be applied or even identify the connection when in use on a banjo fitting.

FIGS. 9 and 10 show the gasket 14 and sealing ring 16 in use and the orientation indicator 52 can be clearly seen whilst the gasket 14 and sealing ring 16 are in use.

In yet further embodiments the gasket 14 may be a further sealing ring 16 or any other sealing means for example a usit sealing ring.

The sealing ring 16 and indeed the gasket 14 may be asymmetric in profile and as such the correct installation orientation is vital to avoid leaks in fluid connections. The orientation indicator 52 provides an easy reference to ensure correct installation orientation.

The disclosure is not limited to the specific embodiments or examples described herein, and may be modified or adapted without departing from the scope of the present disclosure.

The invention claimed is:

1. A sealing device for banjo fittings, the sealing device comprising:
   a first sealing component;
   a second sealing component;
   wherein the first sealing component differs from the second sealing component; and
   one or more straps;
   wherein the one or more straps attach the first sealing component to the second sealing component, and wherein one or more of the straps includes an orientation indicator.

2. The sealing device of claim 1, wherein the orientation indicator is an arrow formed by a shape of the strap.

3. The sealing device of claim 1 wherein the orientation indicator is moulded into one or more of the straps.

4. The sealing device of claim 1 wherein one or more of the straps includes an RFID tag.

5. The sealing device of claim 1 wherein the first sealing component is a sealing ring and the second sealing component is a gasket.

\* \* \* \* \*